Sept. 10, 1957  H. S. MYERS  2,806,137

FREQUENCY STABILIZER

Filed Feb. 8, 1946

*INVENTOR.*
HOMER S. MYERS
BY
*m. o. Hayes*
ATTORNEY

United States Patent Office 2,806,137
Patented Sept. 10, 1957

2,806,137

FREQUENCY STABILIZER

Homer S. Myers, Cambridge, Mass., assignor, by mesne assignments, to the United States of America as represented by the Secretary of the Navy Application February 8, 1946, Serial No. 646,447

4 Claims. (Cl. 250—17)

This invention relates to apparatus for stablizing oscillator frequency and more particularly to apparatus for stabilizing the frequency of magnetrons as used in radar beacons.

The present radar beacon is essentially a receiver for accepting an interrogating pulse from aircraft and using it to trigger a transmitter which replies to the interrogating pulse with a coded series of pulses of a different frequency. In more detail it consists of a receiving antenna for receiving an interrogating pulse from an aircraft, a receiver for amplifying and detecting the interrogating pulse, a discriminator for rejecting undesirable pulses which are not intended for interrogation, a modulator actuated by the pulses which pass through the discriminator, and ordinarily a magnetron which sends out reply pulses over a transmitting antenna in accordance with the coded output of the modulator. The receiver on the interrogating aircraft is pretuned to the standard radar beacon reply frequency. Therefore the frequency of the replying magnetron must be accurately maintained.

The problems of manufacturers make it difficult to obtain quantities of magnetrons that operate at exactly this standard frequency. Moreover, the operating frequency of a magnetron drifts with temperature and depends on the radio frequency load and other operating conditions. These variations make it necessary to be able to adjust the magnetron frequency in radar beacon applications. Heretofore, this adjustment has been accomplished by varying the load impedance connected to the magnetron. A cavity resonant at the standard radar beacon reply frequency was coupled to the magnetron output wave guide to provide the type of variable load impedance which would tend to hold the magnetron at the standard frequency. This method is only successful to the extent that it holds the frequency to within three megacycles above or below the standard frequency.

It is an object of this invention to provide apparatus to stabilize the frequency of radar beacon magnetrons to within very close limits.

It is a further object of this invention to stabilize the frequency of radar beacon magnetrons to a predetermined and adjustable frequency.

These and other objects will become apparent upon a consideration of the following description together with the accompanying drawings, in which.

Figure 1:
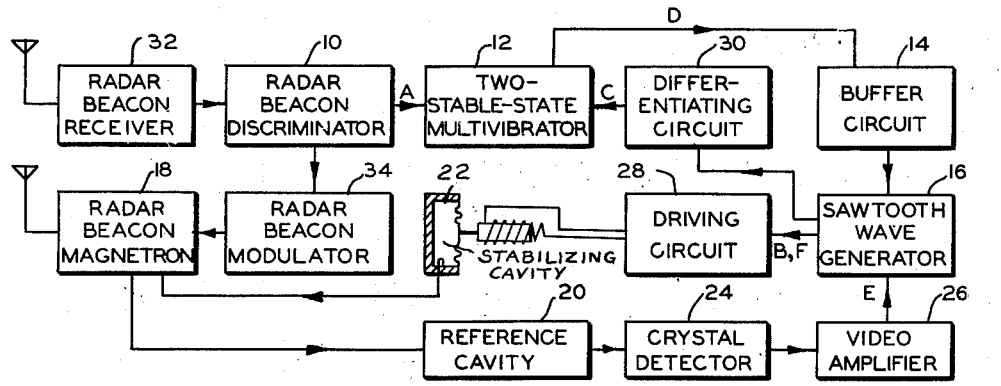
Fig. 1 is a block diagram of an embodiment of this invention.

Fig. 1 discloses a radar beacon system comprising radar beacon receiver 32, radar beacon discriminator 10, radar beacon modulator 34, and radar beacon magnetron 18. An interrogation pulse from an aircraft is amplified and detected by radar beacon receiver 32. Radar beacon discriminator 10 analyzes the output of radar beacon receiver 32 and rejects all undesirable pulses which are not intended for interrogation. Interrogation pulses which pass through radar beacon discriminator 10 trigger radar beacon modulator 34. Radar beacon magnetron 18 sends out reply pulses in accordance with the coded output of radar beacon modulator 34.

Fig. 1 also discloses apparatus for stabilizing the frequency of radar beacon magnetron 18. Radar beacon discriminator 10 provides the first trigger for two-stable-state multivibrator 12 which is in equilibrium with either of its two tubes conducting. Buffer circuit 14 is interposed between two-stable-state multivibrator 12 and sawtooth wave generator 16 to prevent undesirable loading of the former. Radar beacon magnetron 18 is coupled to reference cavity 20 and stabilizing cavity 22. The resonant frequency of reference cavity 20 is adjustable and it is pretuned to the standard radar beacon reply frequency. Crystal detector 24 rectifies the voltage developed in reference cavity 20 when the latter is excited with its resonant frequency. Video amplifier 26 amplifies the output of crystal detector 24 and feeds the amplified output into sawtooth wave generator 16. One end of stabilizing cavity 22 is a thin diaphragm actuated by a voice coil in such a manner that the resonant frequency of stabilizing cavity 22 is related to the amount of current flowing through the voice coil. The output of sawtooth wave generator 16 is fed into the voice coil on stabilizing cavity 22 through driving circuit 28. Differentiating circut 30 dfferentiates an output of sawtooth wave generator 16 and uses the differentiated output to provide a second trigger for two-stable-state multivibrator 12 at the end of each sawtooth wave.

Figure 2:
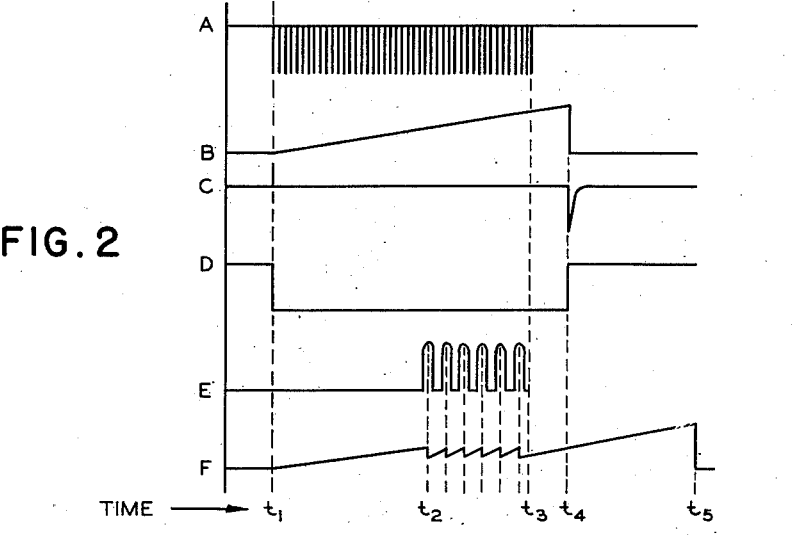
Fig. 2 is a group of wave forms of voltages found at various points in the embodiment shown in Fig. 1.

Fig. 2 discloses voltage wave forms at points A, B, C, D, E, and F on the block diagram in Fig. 1 in the proper time relationship to one another. When an aircraft interrogates radar beacon receiver 32 at time $t_1$, radar beacon discriminator 10 triggers two-stable-state multivibrator 12 with pulses shown in wave form A cutting off the first tube and causing the second tube to conduct. The time between the pulses in wave form A is inversely proportional to the pulse repetition frequency of the radar on the interrogating aircraft but it is the first pulse which provides the trigger for two-stable-state multivibrator 12 and the succeeding pulses have no further effect other than triggering the radar beacon modulator 34. The resulting drop in plate voltage on the second tube of two-stable-state multivibrator 12 is used to cut off the tube in buffer circuit 14. The resulting rise in plate voltage on the tube in buffer circuit 14 in turn is used to supply plate voltage to sawtooth wave generator 16 and start it in operation.

Neglecting, temporarily, the output from video amplifier 26, sawtooth wave generator 16 would complete one cycle at time $t_4$ fifteen or twenty seconds after time $t_1$ and the output wave form would be similar to B in Fig. 2. Differentiating circuit 30 would provide the second trigger for two-stable-state multivibrator 12. This second trigger would occur at time $t_4$ as shown on wave form C in Fig. 2 as a result of the steepness in the back trace of the sawtooth wave generator 16 output wave form. The second trigger would cut off the second tube of two-stable-state multivibrator 12 and cause the first tube to conduct. This sequence of operation would result in a voltage of wave form D in Fig. 2 being fed into buffer circuit 14. The plate voltage would be removed from sawtooth wave generator 16 after one cycle providing the interrogation stopped at time $t_3$ as shown in wave form A of Fig. 2 and another sawtooth cycle would not be initiated until the interrogation was resumed.

The output of sawtooth wave generator 16 is applied through driving circuit 28 to the voice coil of stabilizing cavity 22 so that the rsonant frequency of stabilizing cavity 22 is swept through a range of frequencies. The effect of stabilizing cavity 22 is such as to cause the frequency of the radar beacon magnetron 18 to be swept through a range also as it replies pulse for pulse to the interrogation from the aircraft. When the frequency of radar beacon magnetron 18 passes through the resonant frequency of reference cavity 20 at time $t_2$ the latter is excited momentarily. Crystal detector 24 detects this excitation and provides an output which, after being amplified by video amplifier 26, is applied to sawtooth wave generator 16 in such a way that the slowly rising edge of the output wave form of the latter is caused to drop back slightly before resuming its gradual rise. This sequence repeats itself as shown in wave form E of Fig. 2 for the crystal detector 24 output and in wave form F of Fig. 2 for the sawtooth wave generator 16 output until the interrogation is stopped at time $t_3$. Sawtooth wave generator 16 then goes on to complete its cycle at time $t_5$ and another cycle is not initiated until interrogation by an aircraft is resumed. The part of the output wave form shown in wave form F between times $t_2$ and $t_3$, when applied through driving circuit 28 to the voice coil on stabilizing cavity 22, adjusts stabilizing cavity 22 to the dimensions required to hold the output of radar beacon magnetron 18 at the preset resonant frequency of reference cavity 20.

Figure 3:
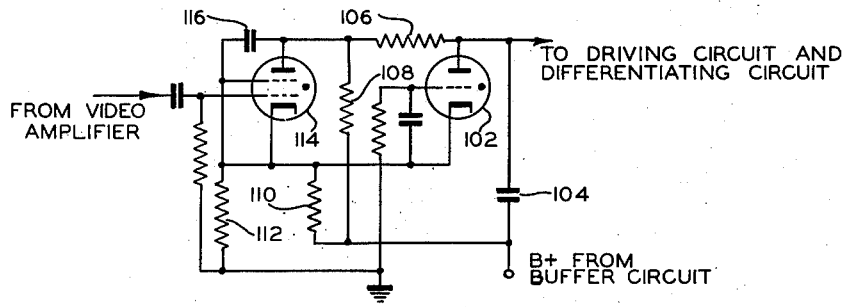
Fig. 3 is a schematic diagram of a sawtooth wave generator of the type which could be used in the embodiment shown in Fig. 1.

In Fig. 3 is disclosed a sawtooth generator which comprises a relaxation oscillator and a sweep circuit connected to operate in the embodiment of this invention described above. Type 884 tube 102 and its associated circuit constitute the very low frequency relaxation oscillator with a period of from fifteen to twenty seconds. The period of the sawtooth output from this relaxation oscillator is determined by the time constant of condenser 104 and resistors 106 and 108. The voltage from this circuit sweeps from a low positive value determined by the voltage divider comprising resistors 110 and 112 between B+ and ground and a more positive value tending toward B+ potential but determined by the firing potential of type 884 tube 102. At some time during this long period sweep a positive pulse from crystal detector 24 on Fig. 1 is applied to the control grid of type 2050 tube 114 on Fig. 3 to cause it to fire. Immediately the plate of type 2050 tube 114 and therefore the junction between resistors 106 and 108 will fall to a low positive value and then rise approximately linearly at a rate determined by the time constant of condenser 116 and resistor 108. The time constant of this sweep circuit is many times smaller than that of the relaxation oscillator. The resulting effect on the sawtooth output of the relaxation oscillator is the notch shown at time $t_2$ on wave form F on Fig. 2. This sequence of events repeats itself every time radar beacon magnetron 18 on Fig. 1 passes through the resonant frequency of reference cavity 20 on Fig. 1 and causes the positive pulse which fires type 2050 tube 114 on Fig. 3.

What is claimed is:

1. Apparatus for stabilizing the frequency of a radar beacon magnetron comprising, a stabilizing cavity the resonant frequency of which is variable electrically, said stabilizing cavity being coupled to said radar beacon magnetron, a sawtooth wave generator the output of which is used to vary the resonant frequency of said stabilizing cavity, a reference cavity being coupled to said radar beacon magnetron and excitable thereby, and a detector for detecting excitation of said reference cavity and altering the wave form of said sawtooth wave generator.

2. Apparatus for stabilizing the frequency of a radar beacon magnetron comprising, a stabilizing cavity being coupled to said radar beacon magnetron, one end of said stabilizing cavity comprising a voice coil and diaphragm operated thereby, the resonant frequency of said stabilizing cavity being related to the current through said voice coil, a sawtooth wave generator the output thereof being applied to said voice coil, the operation of said sawtooth wave generator being initiated by the reception of a radar beacon interrogation, a reference cavity pretuned to the standard radar beacon reply frequency, said reference cavity being coupled to said radar beacon magnetron and excitable thereby when the frequency thereof passes through the standard radar beacon reply frequency, and a detector for detecting excitation of said reference cavity, and means responsive to the output of said detector for modifying the wave form of said sawtooth wave generator.

3. Apparatus for stabilizing the frequency of a radar beacon magnetron comprising, a stabilizing cavity being coupled to said radar beacon magnetron for affecting the frequency thereof, one end of said stabilizing cavity comprising a voice coil and diaphragm operated thereby for varying the resonant frequency of said stabilizing cavity by varying the physical dimensions thereof, a sawtooth wave generator the output thereof being applied to said voice coil, a two-stable-state multivibrator for initiating the operation of said sawtooth wave generator upon the reception of a radar beacon interrogation and interrupting the operation of said sawtooth wave generator after one full cycle of operation thereof, a reference cavity pretuned to the standard radar beacon reply frequency, said reference cavity being coupled to said radar beacon magnetron and excited thereby when the frequency thereof passes through the standard radar beacon reply frequency, a detector for detecting the excitation of said reference cavity, and means in said sawtooth wave generator responsive to the output of said detector for modifying the wave form of said sawtooth wave generator.

4. Apparatus for stabilizing the frequency of a radar beacon magnetron comprising, a two-stable-state multivibrator obtaining its first triggering pulse from the radar beacon discriminator at the time the radar beacon is interrogated, a buffer circuit to prevent undesirable loading of said two-stable-state multivibrator, a sawtooth wave generator obtaining plate voltage from the output of said two-stable-state multivibrator through said buffer circuit, a differentiating circuit for providing a second triggering pulse for said two-stable-state multivibrator when said sawtooth wave generator has completed one cycle, a stabilizing cavity coupled to said radar beacon magnetron so as to influence the frequency thereof, one end of said stabilizing cavity comprising a voice coil operated diaphragm for varying the resonant frequency of said stabilizing cavity by varying the physical dimensions thereof in response to current variations in said voice coil, a driver to apply the output of said sawtooth wave generator to said voice coil, a reference cavity pretuned to the standard radar beacon reply frequency, said reference cavity being coupled to said radar beacon magnetron and excited thereby only when the frequency thereof passes through said standard radar beacon reply frequency, a crystal detector for rectifying the voltages in said reference cavity, and a video amplifier for amplifying the rectified voltages and applying them to said sawtooth wave generator for the purpose of modifying the wave form thereof.

References Cited in the file of this patent

UNITED STATES PATENTS

| Re. 22,587 | Varian et al. | Jan. 2, 1945 |
|---|---|---|
| 2,337,214 | Tunick | Dec. 21, 1943 |
| 2,398,793 | Magnuski | Apr. 23, 1946 |
| 2,404,568 | Dow | July 23, 1946 |
| 2,410,817 | Ginzton et al. | Nov. 12, 1946 |
| 2,414,100 | Hansen et al. | Jan. 14, 1947 |
| 2,434,294 | Ginzton | Jan. 13, 1948 |
| 2,475,074 | Bradley et al. | July 5, 1949 |
| 2,502,456 | Hansen et al. | Apr. 4, 1950 |